(12) United States Patent
He et al.

(10) Patent No.: US 6,575,089 B2
(45) Date of Patent: *Jun. 10, 2003

(54) APPARATUS AND METHOD OF HEAT EMBOSSING THIN, LOW DENSITY POLETHYLENE FILMS

(75) Inventors: Fugui He, Penfield, NY (US); Harold Moore, Pittsford, NY (US); Douglas G. Maley, Rochester, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/518,652

(22) Filed: Mar. 3, 2000

(65) Prior Publication Data

US 2002/0139255 A1 Oct. 3, 2002

(51) Int. Cl.⁷ .................................. B41C 1/24
(52) U.S. Cl. .......................... 101/32; 101/27
(58) Field of Search ............... 101/32, 4, 31, 101/3.1, 28, 16, 25, 9, 27; 264/293, 284, 280

(56) References Cited

U.S. PATENT DOCUMENTS

| | | | |
|---|---|---|---|
| 2,388,528 A | * 11/1945 | Curtiss | 101/32 |
| 3,176,058 A | 3/1965 | Mittman | 264/284 |
| 3,311,692 A | 3/1967 | Baird | 264/293 |
| 3,374,303 A | 3/1968 | Metz, Jr. | 264/216 |
| 3,584,572 A | 6/1971 | Apicella | 101/24 |
| 3,761,338 A | 9/1973 | Ungar et al. | 156/219 |
| 3,950,480 A | 4/1976 | Adams et al. | 264/284 |
| 4,000,243 A | * 12/1976 | Curren | 264/293 |
| 4,223,204 A | * 9/1980 | Benedict | 101/9 |
| 5,078,710 A | * 1/1992 | Suda et al. | 604/383 |
| 5,722,320 A | * 3/1998 | Meyer | 101/32 |
| 5,938,878 A | * 8/1999 | Hurley et al. | 156/219 |

FOREIGN PATENT DOCUMENTS

JP 00039303 * 3/1980 ............ 101/9

\* cited by examiner

Primary Examiner—Anthony H. Nguyen
(74) Attorney, Agent, or Firm—Clyde E. Bailey, Sr.

(57) ABSTRACT

A method and apparatus for embossing plastic web materials, for instance, low density polyethylene film, have a movable, first embossing element having a plurality of male dies associated with a heat transferable member and a stationary, second embossing element having a plurality of female dies. The temperature of the heat transferable member is controllable so that the male dies can deform a range of deformable plastic materials. The stationary, second embossing element is alignable relative to the first embossing element and unheated so that the female dies are maintained at about ambient temperature during embossing.

9 Claims, 3 Drawing Sheets

APPARATUS AND METHOD OF HEAT EMBOSSING THIN, LOW DENSITY POLETHYLENE FILMS

FIELD OF THE INVENTION

The invention relates generally to the field of embossing. More particularly, the invention concerns an apparatus and method of embossing thin, low density polyethylene (LDPE) film using a temperature controlled die and an opposing unheated die.

BACKGROUND OF THE INVENTION

Currently, radio frequency (RF) heating is the preferred industry technique for embossing thin film materials. In a typical RF process, a single die is connected to a high voltage RF source. The film material or web to be embossed is then arranged on a grounded metallic plate and positioned for engaging contact by the single die. RF generates heat in the web, directly or indirectly, which then softens the material to near its melting point. With the associated pressure from the dies on the film material or web, a permanent impression of the intaglio on the dies is transferred to the web. A well-known shortcoming of the current RF technique is that it is extremely sensitive to the embossing material. In particular, film materials like polyethylene, have proven to be very poor for absorbing RF energy. Moreover, the embossing process cycle time using RF is exceedingly long because of ineffectiveness of certain materials in absorbing RF energy. Further, another shortcoming of present RF embossing techniques is that the quality of the embossed image is not predictably consistent over a range of film material properties. This is particularly true with respect to embossing thin, low density polyethylene and similar film materials, such as polyester and polystyrene.

U.S. Pat. No. 3,584,572 discloses a method and apparatus for simultaneously heat stamping, embossing and cutting a workpiece, such as plastic sheet material, that uses a single die. However, a shortcoming of this development is that it uses a single die for cutting and embossing the film and the embossed image is formed only along an edge of the workpiece.

Moreover, heretofore, embossed thermoplastic films such as polyethylene, polypropylene, polybutene-1, polyvinyl chloride, and other flexible thermoplastics normally extruded into film have been made by various methods. One method used to prepare embossed thermoplastic film is to extrude the thermoplastic material, e.g., polyethylene, from a conventional slot extrusion die onto a continuously moving, smooth, cooled casting surface, e.g., a chill roll. The embossed films made by the above described process often produce poor roll conformation, i.e., have hard or soft spots, wrinkle or sag due to the inability to distribute zones of thickness variation across the width of the roll of embossed film. Embossed film rolls of poor conformation produces problems when running the film through fabricating machines or through a film printing apparatus.

An example of a method and apparatus for producing film according to the foregoing slot die-chill cast roll technique is shown in U.S. Pat. No. 3,374,303.

Another technique used for embossing plastic film heretofore has been the utilization of a heated engraved embossing roll used in conjunction with a backup roll. The resultant embossed film usually has a very shallow and poorly defined pattern. An example of an apparatus and process for carrying out embossing of this type is shown in U.S. Pat. No. 3,176,058.

One of the drawbacks when using the heated drum or roll method to apply heat to the film prior to embossing is the difficulty in heating the film sufficiently so that it will take a deep, permanent embossed pattern which is a true reproduction of the engraved surface of the engraving roll.

Thus, it can be seen that the film embossing art is in need of the apparatus and method of the present invention whereby thermally deformable plastic material, such as low density polyethylene can be controllably heated to near its melting point and embossed, and then quickly cooled to obtain a density depression in the plastic web material forming a deep, permanent embossed pattern on the material. Moreover, the invention enables wide variation in control of the parameters which will permit variation in the physical properties of the embossed material, i.e., modulus, surface gloss, embossed pattern depth, tensile strength, and impact strength.

SUMMARY OF THE INVENTION

It is, therefore, an object of the invention to provide a method of embossing that is more effective than present techniques.

Another object of the invention is to provide a method of embossing that utilizes a pair of dies using a controlled heat source to control the heat generated in the plastic material.

The present invention is directed to overcoming one or more of the problems set forth above. Briefly summarized, according to one aspect of the present invention, an apparatus for embossing indicia on a plastic web material comprises:

a rigid upright frame;

a source of power associated with said frame;

a first, movable embossing element mounted for movement on said frame, said first embossing element comprising a heat transferable member heated by said source of power, a mounting plate member having a first side and a second side, said first side being affixed to said heat transferable member, and a plurality of male dies affixed to said second side of said mounting plate member, each one of said plurality of male dies having an intaglio design thereon; and a second, stationary embossing element supportably alignable in said frame with said first embossing element, said second embossing element comprising a plurality of female dies each one of which to receive a corresponding one of said plurality of male dies, one of said plurality of female dies having a corresponding intaglio design thereon and a mounting plate for supporting said plurality of female dies.

In another aspect of the invention, a method of embossing thermally deformable plastic web material comprising the steps of:

(a) providing an embossing unit comprising a first, movable embossing element having a heat transferable member, a mounting plate member supported affixed to said heat transferable member and a plurality of first dies having a predetermined male pattern affixed to said mounting plate member; and a cooperating, second embossing element alignable with said first embossing element, said second embossing element having a plurality of second dies having a predetermined female pattern for receiving said predetermined male pattern of said first dies, and, a support plate for supporting said plurality of second dies;

(b) providing power to said heat transferable member, said heat transferable member heated to a predetermined temperature;

(c) arranging said thermally deformable plastic web material on said plurality of dies;

(d) moving the first embossing element towards said second embossing element so that said plurality of first dies engageably contact said thermally deformable plastic web material;

(e) maintaining said plurality of first dies in contact with said thermally deformable plastic web material for a predetermined period of time thereby forming an embossed image on said thermally deformable plastic web material corresponding to said predetermined male and females patterns on said plurality of first dies and said plurality of second dies; and, (f) moving the first, movable embossing element away from the thermally deformable plastic web material so as to permit cooling of the thermally deformable plastic web material.

The present invention has the following advantages: the embossed image has a predictably high quality; the process enables multiple logos to be produced on a single web; the processing time is much shorter; the process is effective for a range of materials, particularly polyethylene; and it is easier to operate in a production.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
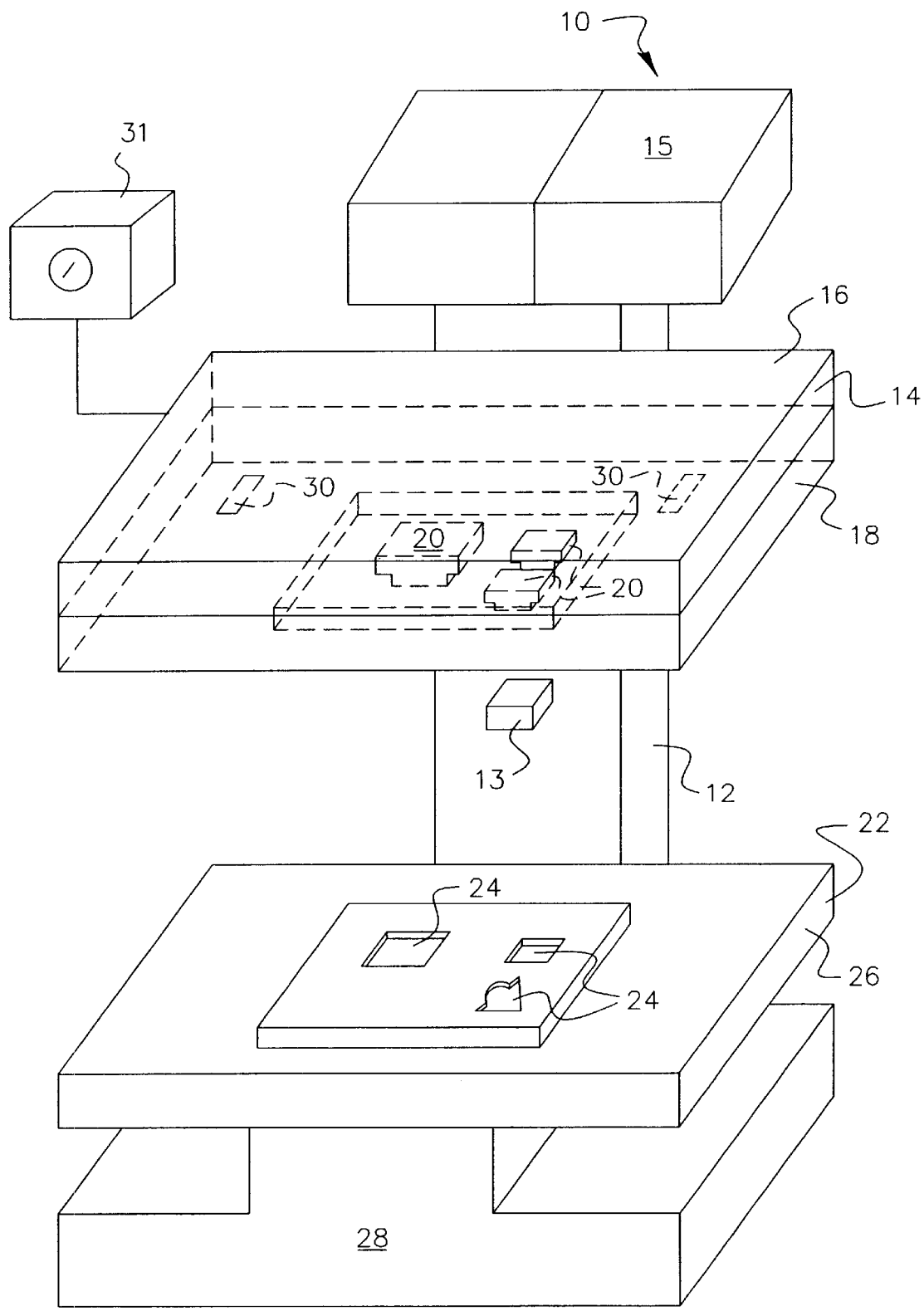
FIG. 1 is a perspective view of embossing unit with dies separated apart.
Figure 2:
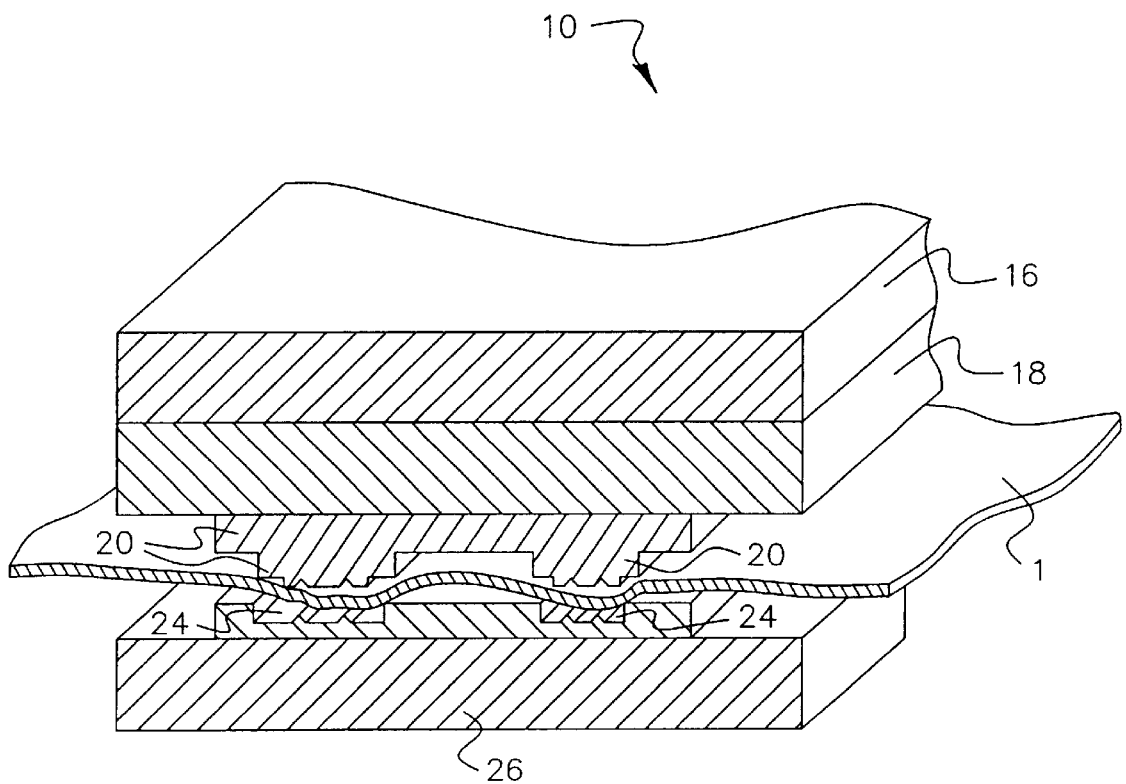
FIG. 2 is a cross-section view of the embossing unit showing dies compressed about a web to be embossed.
Figure 3:
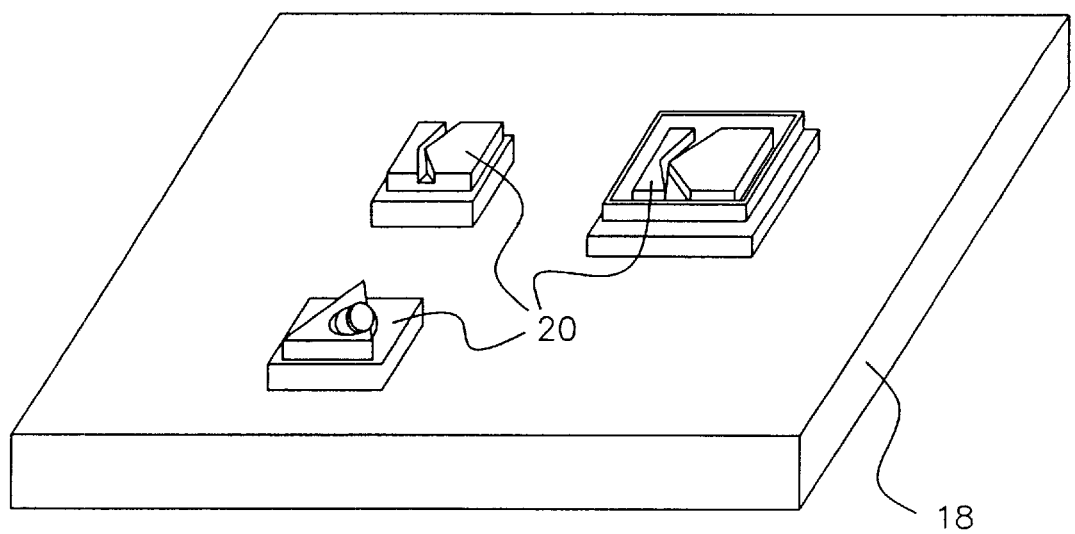
FIG. 3 is a top plan view of the top die.
Figure 4:
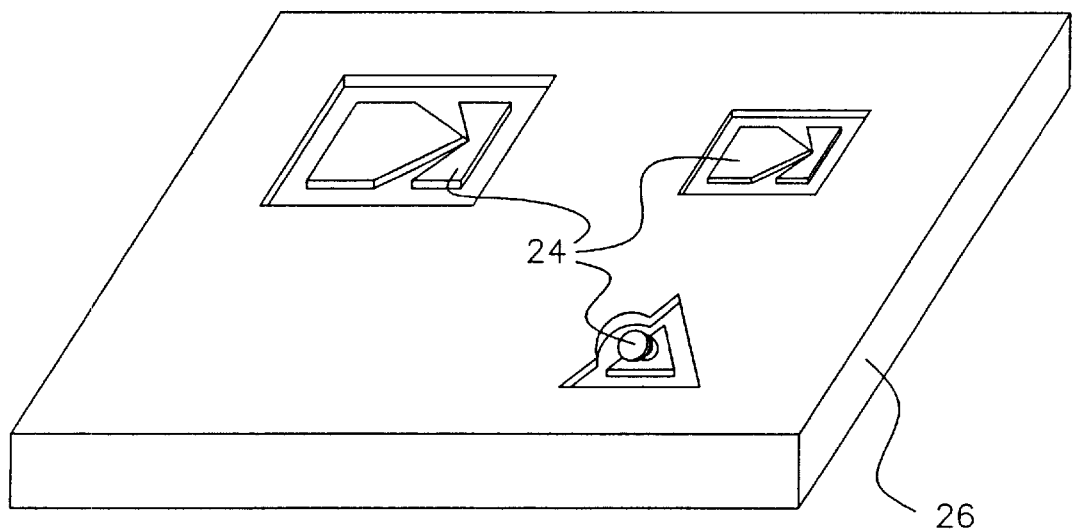
FIG. 4 is a top plan view of the bottom die.

Turning now to the drawings, and more particularly to FIGS. 1 and 2, apparatus 10 of the invention is illustrated. Broadly defined, apparatus 10 for embossing plastic web material 1, such as thin, low density polyethylene film (LDPE), has a pair of opposing embossing elements 14, 22 (described below) arranged in a rigid upright frame 12 and a source of power 15 conveniently associated with frame 12 for activating associated components (described below). A plurality of male dies 20 in first embossing element 14 is controllably heated by a heat transferable member 16. Opposing female dies 24 in second embossing element 22 remain at ambient room temperature throughout the embossing process. Through an air cylinder the heated male dies 20 are pressed down on plastic web material 1 toward bottom, female dies 24. The plastic web material 1 arranged between top, male dies 20 and bottom, female dies 24 undergoes an embossing process under the right temperature and the pressure. After the top, male dies 20 are removed from the plastic web material 1, embossed indicia, e.g., logos, remain permanently impressed in the plastic web material 1. Using this process, we surprisingly found that the quality of the embossed impression is predictably consistent compared with prior art methods.

Referring to FIG. 1, more particularly, first, movable embossing element 14 is mounted for vertical movement on frame 12. Skilled artisans will appreciate that vertical movement of embossing element 14 may be achieved by any number of conventional means, such as, by a screw drive mechanism, belt drive mechanism or chain drive mechanism. Importantly, first embossing element 14 has a heat transferable member 16, preferably made of metallic alloy material, heated by the source of power 15. Those skilled in the art will appreciate that heat transferable member 16 may be made of other thermally conductive materials, such as aluminum and aluminum alloy. These materials are known to have favorable thermal conductivity suitable for embossing. In the preferred embodiment, heat transferable member 16 is mounted to a mounting plate member 18 having a first side (not shown) and similar second side (not shown). First side is structurally attached to heat transferable member 16 while a plurality of male dies 20 are affixed to the second side of the mounting plate member 18. Hence, mounting plate member 18 provides means of associating the male dies 20 to the heat transferable member 16. Those skilled in the art of embossing will appreciate that the male dies 20 and corresponding female dies 24 (described below) have some sort of predetermined intaglio design thereon for embossing the plastic web material 1.

Referring again to FIG. 1, a second, stationary embossing element 22 is arranged for translational and rotational movement about base 28 on frame 12. In a preferred embodiment, second embossing element 22 is alignable relative to the first embossing element 14 by translational and rotational movements on base 28. Alignment of second embossing element 22 is important because the plastic web material 1 can be easily arranged on the second embossing element 22 and then positioned for alignment with first embossing element 14 for embossing. Since second embossing member 22 is stationary relative to first embossing element 14, second embossing element 22 is fixed in a plane against vertical movement on frame 12 relative to first embossing element 14. More particularly, second embossing element 22 comprises the plurality of female dies 24, designed to receive a corresponding one of the plurality of the male dies 20, and die support plate 26. Skilled artisans will appreciate that each of the female dies 24 have corresponding intaglio design thereon and a support plate for supporting said plurality of female dies 24.

Referring to FIG. 1, apparatus 10 further comprises means for controlling the position of the first embossing element 14 relative to the stationary, second embossing element 22. While skilled artisans will appreciate that several means of controlling the position of first embossing element 14 may be used with substantially similar results, we prefer using a stopping switch 13 cooperatively associated with the travel path of movable first embossing element 14. Thus, when first embossing element 14 contacts the stopping switch 13, further movement of the first embossing element 14 is interrupted until the stopping switch 13 is either deactivated or the force exerted by the first embossing member 14 on the stopping switch 13 is removed.

Depicted in FIG. 1, heat transferable member 16 has a temperature controlling means, preferably a thermocouple 30, operably associated with the source of power 15. An important advantage of temperature controlling means is that it enables materials having a range of melting temperatures to be embossed using the apparatus 10 of the invention. Moreover, a means, preferably a timer 31, for controlling the heating time of the heat transferable member 16 is provided. This assures that the plastic web material 1 will sufficiently deform while under controlled heat thereby enabling an embossed image to be impressed on the plastic web material 1.

An important feature of the apparatus 10 of the invention is that second embossing element 22 is unheated and maintains a temperature equal to about ambient temperature while the first embossing element 14 is controllably heated. Because there is no heat source in the second embossing element 22 the surface texture of the plastic web material 1 (LDPE) exposed to the male dies 20 will not be changed after embossing. Thus, we have shown that the invention generates sharp logo images because of this embossing configuration.

In another embodiment of the invention, a method of embossing thermally deformable plastic web material, such as thin, low density polyethylene film, comprises the step of providing an apparatus 10 for embossing as described above. Power is then provided to the heat transferable member such that the heat transferable member is heated to a predetermined temperature. The material to be embossed, typically a thermally deformable plastic web material is then arranged on the female dies. The first embossing element comprising the male dies is then moved into engaging contact with the thermally deformable plastic web material. A stop switch restricting the vertical movement of first embossing element keeps the dies in appropriate position for a predetermined period of time. Thus, an embossed image is formed on the thermally deformable plastic web material corresponding to the predetermined male and female patterns on the male and female dies. After the embossed impression is made on the deformable plastic material, the first, movable embossing element is moved away from the thermally deformable plastic web material so as to permit cooling of the thermally deformable plastic web material.

The invention has been described with reference to a preferred embodiment. However, it will be appreciated that variations and modifications can be effected by a person of ordinary skill in the art without departing from the scope of the invention.

| PARTS LIST | |
|---|---|
| 1 | film or plastic web material |
| 10 | apparatus |
| 12 | frame |
| 13 | stopping switch |
| 14 | first embossing element |
| 15 | source of power |
| 16 | heat transferable member |
| 18 | mounting plate member |
| 20 | male dies |
| 22 | second embossing element |
| 24 | female dies |
| 26 | die support plate |
| 28 | base of apparatus 10 |
| 30 | thermocouple |
| 31 | timer |

What is claimed is:

1. Apparatus for embossing plastic web material, said apparatus comprising:

a rigid upright frame;

a source of power associated with said frame;

a first, movable embossing element mounted for movement on said frame, said first embossing element comprising a heat transferable member heated by said source of power, a mounting plate member having a first side and a second side, said first side being affixed to said heat transferable member, and a plurality of male dies affixed to said second side of said mounting plate member, each one of said plurality of male dies having an intaglio design thereon; and a second, stationary embossing element supportably mounted in said frame opposite said first embossing element, said second embossing element comprising a plurality of female dies each one of which being configured to receive a corresponding one of said plurality of male dies, each one of said plurality of female dies having a corresponding intaglio design thereon and a mounting plate for supporting said plurality of female dies; and, wherein said second, stationary embossing element being provided with structure for rotationally and translationally alignable movements relative to said first, moveable embossing element; and, wherein said second embossing element being maintained at about ambient room temperature.

2. The apparatus recited in claim 1 further comprising means for controlling the position of said first embossing element relative to said stationary second embossing element, said means comprising a stopping switch fixed cooperatively associated with said movable first embossing element.

3. The apparatus recited in claim 1 further comprising means for controlling the temperature of said heat transferable member, said means comprising a thermocouple operably connected to said source of power.

4. The apparatus recited in claim 1 further comprising a means for controlling the heating time of said heat transferable member, said means for controlling comprising a timer.

5. A method of embossing thin, low-density polyethylene films, comprising the steps of:

(a) providing an embossing unit comprising a first, movable embossing element having a heat transferable member, a mounting member supportedly affixed to said heat transferable member and a plurality of first dies having a predetermined male pattern affixed to said mounting plate member; and a cooperating, second embossing element having structure for translational and rotational alignable movements relative to said first embossing element, said second embossing element having a plurality of second dies having a predetermined female pattern for receiving said predetermined male pattern of said plurality of first dies, and, a support plate for supporting said plurality of second dies;

(b) providing power to said heat transferable member, said heat transferable member heated to a predetermined temperature;

(c) arranging said thin, low density polyethylene film on said plurality of second dies;

(d) moving said first embossing element towards said second embossing element so that said plurality of first dies engageably contact said thin, low density polyethylene film;

(e) maintaining said plurality of first dies in contact with said low density polyethylene film for a predetermined period of time thereby forming an embossed image on said thin, low density polyethylene film corresponding to said predetermined male and female patterns on said plurality of first dies and said plurality of second dies while maintaining said second embossing element at about ambient room temperature; and, (f) moving the first, movable embossing element away from the thin, low density polyethylene film so as to permit cooling of the film.

6. A method of embossing thermally deformable plastic web material comprising the steps of:

(a) providing an embossing unit comprising a first, movable embossing element having a heat transferable member, a mounting plate member supportedly affixed to said heat transferable member and a plurality of first dies having a predetermined male pattern affixed to said mounting plate member; and a cooperating, second embossing element being provided with structure for translationally and rotationally alignable movements relative to said first embossing element, said second embossing element having a plurality of second dies having a predetermined female pattern for receiving said predetermined male pattern of said first dies, and, a support plate for supporting said plurality of second dies;

(b) providing power to said heat transferable member, said heat transferable member heated to a predetermined temperature;

(c) arranging said thermally deformable plastic web material on said plurality of second dies;

(d) moving the first embossing element towards said second embossing element, said second embossing element being maintained at about ambient room temperature and translationally and rotationally alignable so that said plurality of first dies engageably contact said thermally deformable plastic web material;

(e) maintaining said plurality of first dies in contact with said thermally deformable plastic web material for a predetermined period of time thereby forming an embossed image on said thermally deformable plastic web material corresponding to said predetermined male and female patterns on said plurality of first and said plurality of second dies; and, (f) moving the first, movable embossing element away from the thermally deformable plastic web material so as to permit cooling of the thermally deformable plastic web material.

7. The method recited in claim 6 further comprising the step of adjustably controlling the heating temperature of said plurality of first dies so as to deform said thermally deformable plastic web material.

8. The method recited in claim 6 further comprising the step of adjustably controlling the heating time of said heat transferable member.

9. The method recited in claim 6 further comprising the step of adjustably controlling the position of said plurality of fist dies relative to said female dies.

* * * * *